G. M. MERCER.
COMPUTING SCALE.
APPLICATION FILED JUNE 5, 1914.
1,124,052.
Patented Jan. 5, 1915.
2 SHEETS—SHEET 1.
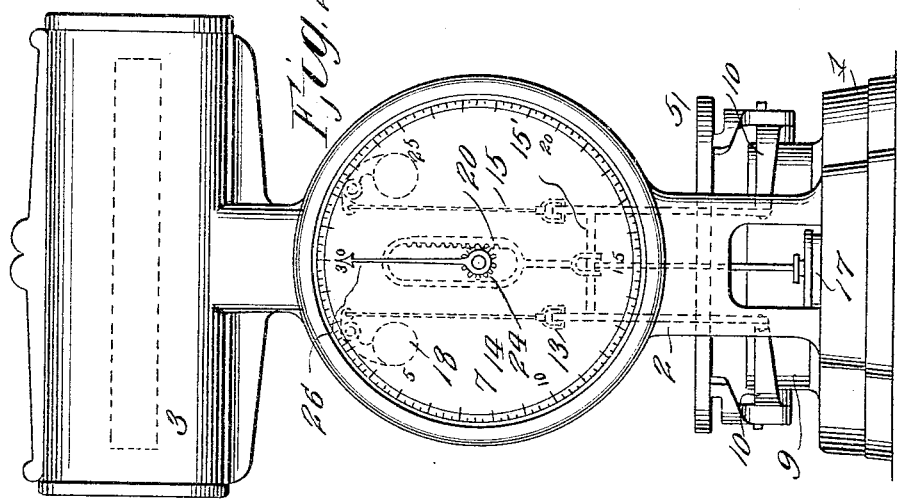
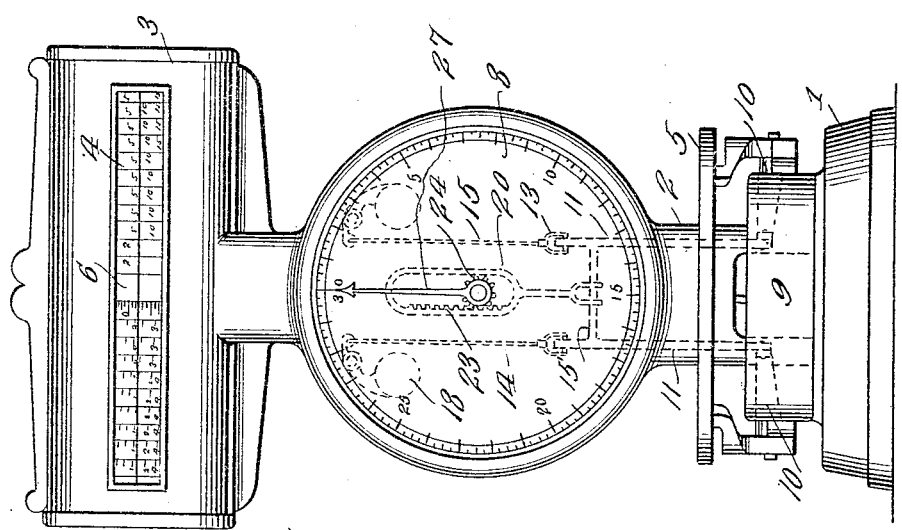
Inventor
George M. Mercer
By Victor J. Evans
Attorney
Witnesses
Frank Hough
C. A. Hines.

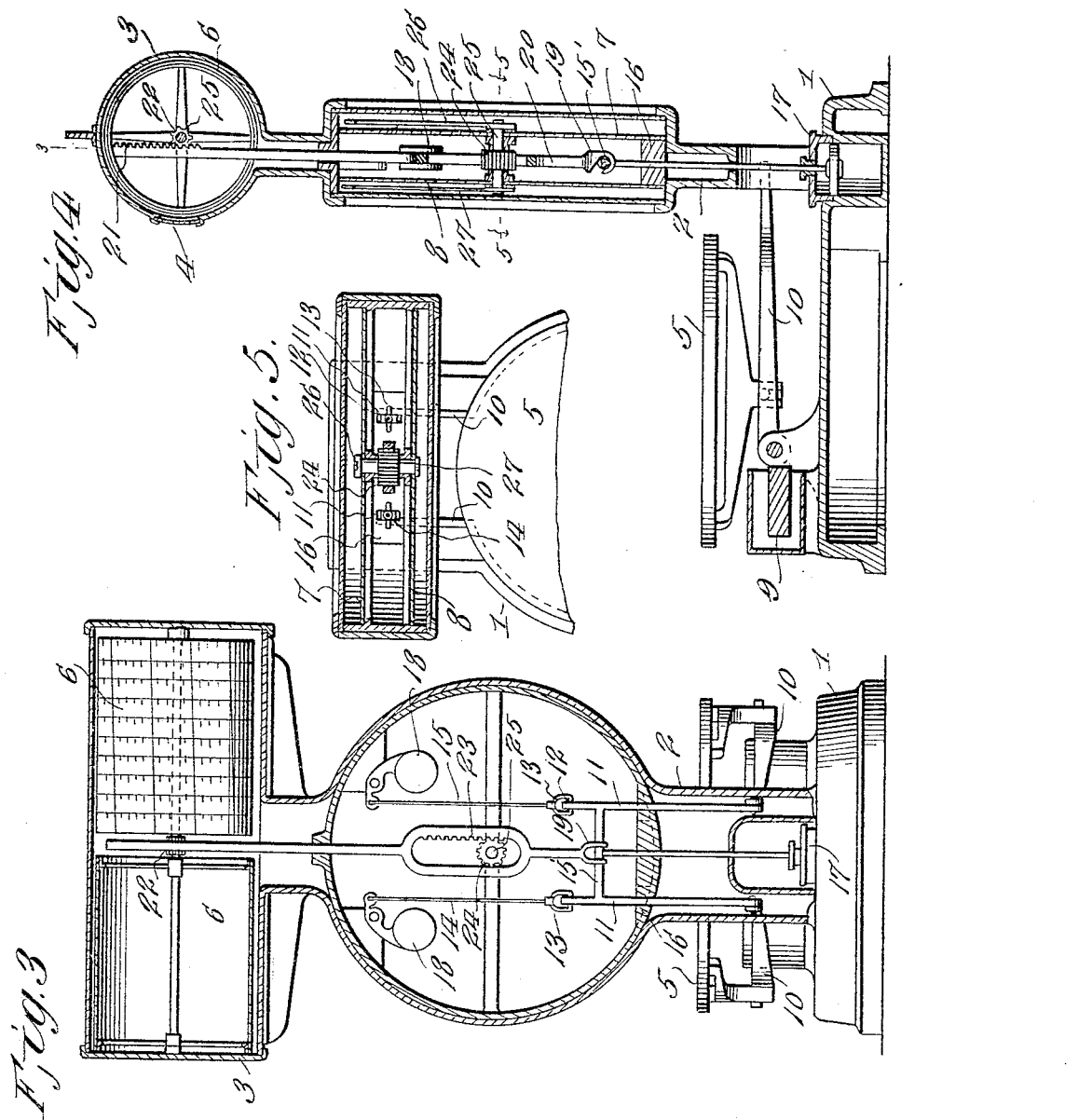

UNITED STATES PATENT OFFICE.

GEORGE M. MERCER, OF CLEVELAND, OHIO.

COMPUTING-SCALE.

1,124,052. Specification of Letters Patent. Patented Jan. 5, 1915.

Application filed June 5, 1914. Serial No. 843,241.

*To all whom it may concern:*

Be it known that I, GEORGE M. MERCER, a citizen of the United States, residing at Cleveland, in the county of Cuyahoga and State of Ohio, have invented new and useful Improvements in Computing-Scales, of which the following is a specification.

This invention relates to improvements in computing scales of the type employing a rotary computing chart or cylinder.

One object of the invention is to provide a scale of this character with auxiliary weight indicating means of the dial and indicator hand type, adapted to indicate in a prominent manner the weight, in pounds and ounces, of the goods being weighed, to avoid trouble and errors in weighing, especially when the merchant is afflicted with bad eyesight.

Another object of the invention is to provide companion dials and indicators on the merchant's and customer's sides of the scale, so that the weight of the foods being weighed will be prominently indicated both to the merchant and customer.

A still further object of the invention is to provide simple, reliable and efficient means controlled by the movement of the scale platter or platform for actuating the computing cylinder and indicating hands or pointers.

With these and other objects in view, the invention consists of the features of construction, combination and arrangement of parts herein fully described and claimed, reference being had to the accompanying drawings in which:—

Figure 1 is a view in elevation looking toward one side of the scale. Fig. 2 is a similar view looking toward the opposite side of the scale. Fig. 3 is a sectional view on line 3—3 of Fig. 4. Fig. 4 is a vertical front to rear section taken on a line centrally through the scale. Fig. 5 is a sectional plan view on the line 5—5 of Fig. 4.

Referring to the drawings, 1 designates the base of the scale frame or platform, 2 an upright portion rising therefrom, 3 a cylindrical casing arranged horizontally at the upper end of said upright portion, said casing being provided with an indicating or observation slot 4, 5 the depressible scale platform or platter mounted upon the base 1, and 6 the rotary computing chart, cylinder or device arranged within the casing 3 and through the slot 4 of which the indications thereon are brought to view.

The general construction of the parts above described may be the same as those in scales now in common use, except that I form the upright portion 2 of the scale frame to provide a substantially circular casing for an auxiliary indicating means, said auxiliary indicating means including front and rear weight indicating dials 7 and 8. These dials are of similar character, having arranged thereon a weight scale in pounds and ounces up to the weighing capacity of the scale, but may be of the same or different diametrical dimensions, as desired. The scale is provided with the usual counterbalancing mechanism 9, which may be of the ordinary construction employed in scales of this character, or of any suitable construction.

Arranged beneath the scale platform or platter 5 is a pair of rocking beams 10, designed for transmitting motion upon the depression of the platform, under the weight of the article placed thereon, to the computing and weight indicating mechanisms. The forward ends of these beams 10 project into the hollow upright 2 and are pivotally connected with the lower ends of vertically movable rods 11, terminating at their upper ends in angular bearings 12 which engage stirrups 13, at the lower ends of a pair of metallic straps or flexible connections 14 and 15. The rods 11 are connected by a cross rod or bar 15′, movable in suitable guide members 16, and constituting a cross head to couple the rods for movements in unison in the same direction and to like degrees. The said cross rod or cross head is connected with an ordinary dash pot cushioning device 17, while the straps 14 are connected at their upper ends to pivotally mounted weights 18, which counterbalance the weight of the beams and coöperate with the dash pot device to secure an easy and regulated action of the motion transmitting devices. The cross rod or cross head 15′ engages a stirrup 19 upon the lower end of a vertically disposed rack bar 20. The upper end of this rack bar extends into the casing 3 and is provided with rack teeth 21 engaging a toothed pinion 22 for communicating motion to the computing chart or cylinder 6, whereby upon the depression of the platform or platter 5 the cylinder will be adjusted to indicate the price of the article at so much per pound according to its weight. The rack bar is also provided with a rack toothed portion 23 which meshes with a pinion 24 on a shaft 25 carrying pointers 26 and 27 to traverse the respective dials 7 and 8, so that in the operation of the computing cylinder the pointers will also be adjusted to indicate the weight of the goods on the platform. The indicating dial 8 and pointer 27 are arranged upon the inner or rear side of the scale and are designed for the convenience of the merchant, before whom will be prominently displayed a weight indication, while the dial 7 and pointer 26 are arranged upon the front or outer face of the scale and similarly indicate the weight of the goods to the customer. The indicating means upon the inner face of the scale will be found of particular advantage to merchants afflicted with bad eyesight, as reference to the cylinder for an indication of the weight, which is given in comparatively small characters, is avoided. The advantage of the device in also showing the weight in a prominent manner to the customer will be evident.

The motion transmitting connections between the rack bar and scale platform obviously, it will be observed, provide for an even and regulated, as well as accurate transmission of motion in such a way as to secure a balancing action, whereby smoothness of operation is insured.

I claim:—

1. A weighing scale including a weighing platform, a rotary computing cylinder, indicating dials at the front and rear of the scale frame, pointers arranged for coöperation with said dials, a shaft carrying said pointers and provided with a pinion, a rack bar meshing with said pinion in gear with said computing cylinder, a pair of beams influenced by the movement of the platform, rods connected for movement in unison and coupled to said beams, said rods being also coupled to the rack bar, and pivotally mounted weighted balancing elements connected with the respective rods.

2. A weighing scale including a weighing platform, a rotary computing cylinder, scale dials on opposite sides of the scale frame or casing, pointers coöperating with said dials, a shaft carrying said pointers and provided with a gear, a rack bar meshing with said gear and in gear with the computing cylinder, a pair of beams influenced by the movement of the platform, rods connected with said beams, a cross connection between the rods and attached to the rack bar, a pair of pivotally mounted weighted balancing elements, and links connecting said weighted balancing elements with the upper ends of said rods on opposite sides of the rack bar.

In testimony whereof I affix my signature in presence of two witnesses.

GEORGE M. MERCER.

Witnesses:
RAYMOND L. GRAY,
J. E. DRUCKER.

Copies of this patent may be obtained for five cents each, by addressing the "Commissioner of Patents, Washington, D. C."